United States Patent
Michalakis et al.

(10) Patent No.: US 10,908,609 B2
(45) Date of Patent: Feb. 2, 2021

(54) APPARATUS AND METHOD FOR AUTONOMOUS DRIVING

(71) Applicant: TOYOTA RESEARCH INSTITUTE, INC., Los Altos, CA (US)

(72) Inventors: Nikolaos Michalakis, Saratoga, CA (US); Julian M. Mason, Redwood City, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 305 days.

(21) Appl. No.: 15/966,023

(22) Filed: Apr. 30, 2018

(65) Prior Publication Data

US 2019/0332111 A1 Oct. 31, 2019

(51) Int. Cl.
*G05D 1/02* (2020.01)
*B60W 30/182* (2020.01)
(Continued)

(52) U.S. Cl.
CPC ......... *G05D 1/0088* (2013.01); *B60W 30/182* (2013.01); *G06K 9/00791* (2013.01);
(Continued)

(58) Field of Classification Search
CPC ......... B60W 2530/14; B60W 2540/30; B60W 2520/105; B60W 2552/05; B60W 30/182;
(Continued)

(56) References Cited

U.S. PATENT DOCUMENTS

| | | | |
|---|---|---|---|
| 7,894,951 B2 * | 2/2011 | Norris | H04L 67/12 180/443 |
| 8,660,734 B2 * | 2/2014 | Zhu | G05D 1/0214 701/23 |

(Continued)

FOREIGN PATENT DOCUMENTS

FR    3 045 177    6/2017

OTHER PUBLICATIONS

Hybrid control and learning with coresets for autonomous vehicles; Guy Rosman ; Liam Paull ; Daniela Rus; 2017 IEEE/RSJ International Conference on Intelligent Robots and Systems (IROS); IEEE Conference Paper (Year: 2017).*

(Continued)

*Primary Examiner* — Cuong H Nguyen
(74) *Attorney, Agent, or Firm* — Oblon, McClelland, Maier & Neustadt, L.L.P.

(57) ABSTRACT

An apparatus for autonomous driving includes data collecting devices and processing circuitry. The data collecting devices collects initial data including first data related to a driving condition that includes a driving environment surrounding a vehicle and motion of the vehicle and second data related to driving the vehicle under the driving condition. The processing circuitry determines, based on the initial data, the driving environment and a vehicle driving mode including a first type of driving environment and a respective autonomous driving mode and an off-road driving environment and a respective non-autonomous driving mode. The data collecting devices collect additional data (Continued)

including first data related to the driving condition and second data related to driving the vehicle under the driving condition when the vehicle driving mode is the non-autonomous driving mode, and trains the vehicle to implement autonomous driving under the off-road driving environment based on the additional data.

23 Claims, 3 Drawing Sheets (51) Int. Cl.
    *G05D 1/00*     (2006.01)
    *G06N 3/04*     (2006.01)
    *G06K 9/00*     (2006.01)

(52) U.S. Cl.
    CPC ..... *G06N 3/0454* (2013.01); *B60W 2520/105* (2013.01); *B60W 2530/14* (2013.01); *B60W 2540/30* (2013.01); *B60W 2552/05* (2020.02); *G05D 2201/0213* (2013.01)

(58) Field of Classification Search
    CPC ......... G05D 2201/0213; G05D 1/0221; G05D 1/0088; G06K 9/00791; G06K 9/6256; G06N 3/0454
    USPC .............................................. 701/27, 26, 28
    See application file for complete search history.

(56) References Cited

U.S. PATENT DOCUMENTS

| | | | |
|---|---|---|---|
| 8,948,955 B2* | 2/2015 | Zhu ................ | B60T 8/885 701/23 |
| 9,120,484 B1* | 9/2015 | Ferguson .......... | G06T 7/20 |
| 10,315,481 B2* | 6/2019 | Lu .................. | B60G 17/015 |
| 10,703,382 B2* | 7/2020 | Sweeney .......... | B60W 60/0053 |
| 2007/0198145 A1* | 8/2007 | Norris .............. | G05D 1/021 701/23 |
| 2010/0026555 A1* | 2/2010 | Whittaker ........ | G05D 1/024 342/70 |
| 2010/0318294 A1* | 12/2010 | Rosing ............. | G01C 21/165 701/500 |
| 2012/0083960 A1* | 4/2012 | Zhu ................. | B60R 1/00 701/23 |
| 2014/0136045 A1* | 5/2014 | Zhu ................. | B60W 30/08 701/23 |
| 2015/0081188 A1 | 3/2015 | Kornhaas | |
| 2016/0137206 A1* | 5/2016 | Chandraker ..... | G06T 17/00 382/104 |
| 2016/0187879 A1* | 6/2016 | Mere ............... | B60W 30/182 701/23 |
| 2017/0008563 A1 | 1/2017 | Popken et al. | |
| 2017/0129298 A1* | 5/2017 | Lu .................. | B60G 17/015 |
| 2017/0201614 A1 | 7/2017 | Deng et al. | |
| 2017/0293302 A1 | 10/2017 | Johnson | |
| 2018/0106885 A1* | 4/2018 | Blayvas .......... | G01S 13/931 |
| 2018/0281797 A1* | 10/2018 | Berels ............. | B60W 10/16 |
| 2019/0279512 A1* | 9/2019 | Daniel ............ | G08G 1/165 |
| 2020/0142408 A1* | 5/2020 | Valois ............. | G05D 1/0088 |
| 2020/0142409 A1* | 5/2020 | Valois ............. | G05D 1/0278 |
| 2020/0142422 A1* | 5/2020 | Valois ............. | G06K 9/00805 |
| 2020/0209867 A1* | 7/2020 | Valois ............. | G01C 21/3811 |
| 2020/0210777 A1* | 7/2020 | Valois ............. | G06K 9/6274 |
| 2020/0226667 A1* | 7/2020 | Kalaimani ....... | G06Q 30/0641 |
| 2020/0255020 A1* | 8/2020 | Simmons ......... | B60W 10/20 |

OTHER PUBLICATIONS

Optimization-Based Control Allocation for Driving/Braking Torque Vectoring in a Race Car ; Moad Kissai ; Bruno Monsuez ; Xavier Mouton ; Adriana Tapus; 2020 American Control Conference (ACC); IEEE Conference Paper. (Year: 2020).*

Dynamic stability analysis of a trotting quadruped robot on unknown rough terrains; Lin Lang ; Jian Wang ; Hongxu Ma ; Qing Wei; 2015 Chinese Automation Congress (CAC); IEEE Conference Paper. (Year: 2015).*

Dual-Mode Vehicle Routing in Mixed Autonomous and Non-Autonomous Zone Networks; Breno Beirigo ; Frederik Schulte ; R. Negenborn; 2018 21st International Conference on Intelligent Transportation Systems (ITSC); IEEE Conference Paper. (Year: 2018).*

Assured Service-Oriented System Engineering Technologies and Applications; Kinji Mori; 2010 Fifth IEEE International Symposium on Service Oriented System Engineering; IEEE Conference Paper. (Year: 2010).*

Towards Selective Tidal-Stream Transport for Lagrangian profilers; Jerome Jouffroy ; Qiuyang Zhou ; Oliver Zielinski; OCEANS'11 MTS/IEEE KONA; IEEE Conference Paper. (Year: 2011).*

* cited by examiner

APPARATUS AND METHOD FOR AUTONOMOUS DRIVING

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Autonomous driving can be implemented using various methods and systems. In an example, U.S. 20170201614 A1 discloses a system and method for unmanned aerial vehicle or a mobile vehicle. The system and method can use mobile device and sensors for autonomous navigation. In addition, a map can be constructed with onboard sensor and mapping algorithms.

SUMMARY

According to an embodiment of the present disclosure, there is provided an apparatus for autonomous driving. The apparatus includes data collecting devices and processing circuitry. The data collecting devices are configured to collect initial data including first data related to a driving condition that includes a driving environment surrounding a vehicle and motion of the vehicle and second data related to driving the vehicle under the driving condition. The processing circuitry can be configured to determine, based on the initial data, the driving environment and a respective vehicle driving mode including a first type of driving environment and a respective autonomous driving mode and a second type of driving environment and a respective non-autonomous driving mode, the second type of driving environment being an off-road driving environment. The processing circuitry can also be configured to implement autonomous driving when the vehicle driving mode is the autonomous driving mode. Further, the processing circuitry can be configured to cause the data collecting devices to collect additional data including first data related to the driving condition and second data related to driving the vehicle under the driving condition when the vehicle driving mode is the non-autonomous driving mode associated with the off-road driving environment, and train the vehicle to implement autonomous driving under the off-road driving environment based on the additional data. In an embodiment, the data collecting devices further comprise a first set of the data collecting devices configured to collect the first data of the initial data and/or the additional data including images, videos, depth information, characteristics of the driving environment surrounding the vehicle, and the motion including acceleration, velocity, and position of the vehicle; and a second set of the data collecting devices configured to collect the second data of the initial data and/or the additional data related to driving the vehicle under the driving condition including routing or driving commands.

In some embodiments, the processing circuitry further comprises a first artificial neural network, or a first neural network, that is based on a computational model implemented using interconnected nodes having connections and includes first parameters associated with the nodes and the connections. Further, the processing circuitry is configured to form a second neural network having second parameters when training the vehicle to implement autonomous driving in an off-road driving environment based on the additional data.

In an example, the processing circuitry is further configured to form a vehicle training dataset based on the additional data, generate an augmented vehicle training dataset based on variations of the vehicle training dataset, and modify the second neural network using the augmented vehicle training dataset.

In an example, the apparatus further comprises memory that is configured to store the present data, the additional data, the vehicle training dataset, the augmented vehicle training dataset, the first neural network including the first parameters, and the second neural network including the second parameters.

In some examples, the data collecting devices comprise a portable sensor that is detachable from the vehicle and is configured to collect information related to the additional data. The data collecting devices can also be configured to synchronize the first data and the second data of the additional data. The data collecting devices also comprise interface circuitry configured to receive routing commands that are associated with the second data of the additional data.

In an example, the apparatus further comprises a wireless communication device configured to communicate wirelessly with another wireless communication device.

According to an embodiment of the present disclosure, there is provided a method for autonomous driving. The method can include collecting initial data including a first data related to a driving condition that includes a driving environment surrounding a vehicle and motion of the vehicle and a second data related to driving the vehicle under the driving condition. The method also includes determining, based on the initial data, the driving environment and a respective vehicle driving mode including a first type of driving environment and a respective autonomous driving mode and a second type of driving environment, that is, an off-road driving environment and a respective non-autonomous driving mode. The method also includes implementing autonomous driving when the vehicle driving mode is the autonomous driving mode. Further, the method includes collecting additional data including first data related to the driving condition and second data related to driving the vehicle under the driving condition when the vehicle driving mode is the non-autonomous driving mode associated with the off-road driving environment. In addition, the method includes training the vehicle to implement autonomous driving under the off-road driving environment based on the additional data.

In an embodiment, the method further includes collecting the first data of the additional data related to the off-road driving environment when the vehicle is driven through the off-road driving environment, and collecting the second data associated with the first data when the vehicle is driven through the off-road driving environment, the second data including driving activities of the vehicle.

In an embodiment, the method can include collecting the first data of the additional data related to the off-road driving environment using a portable sensor deployed outside the vehicle. The method can also include collecting a series of positions of the portable sensor, and generating the second data including routing the vehicle under the off-road driving environment based on the series of positions of the portable sensor.

In an embodiment, the method can include collecting the first data of the additional data related to the off-road driving environment, outputting an image related to the off-road driving environment based on the first data using interface circuitry, and outlining a route for the vehicle to drive through the off-road driving environment using the interface circuitry. In addition, the method can include generating the second data including routing the vehicle under the off-road driving environment based on the route.

In an embodiment, the method can include outputting inquires associated with the first data related to the off-road driving environment using interface circuitry, and receiving features associated with the first data related to the off-road driving environment using the interface circuitry.

According to an embodiment of the present disclosure, there is provided a non-transitory computer readable storage medium having instructions stored thereon that when executed by processing circuitry causes the processing circuitry to perform a method. The method can include collecting initial data including a first data related to a driving condition that includes a driving environment surrounding a vehicle and motion of the vehicle and a second data related to driving the vehicle under the driving condition. The method also includes determining, based on the initial data, the driving environment and a respective vehicle driving mode including a first type of driving environment and a respective autonomous driving mode and a second type of driving environment, that is, an off-road driving environment and a respective non-autonomous driving mode. The method also includes implementing autonomous driving when the vehicle driving mode is the autonomous driving mode. Further, the method includes collecting additional data including first data related to the driving condition and second data related to driving the vehicle under the driving condition when the vehicle driving mode is the non-autonomous driving mode associated with the off-road driving environment. In addition, the method includes training the vehicle to implement autonomous driving under the off-road driving environment based on the additional data.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

An autonomous vehicle can be configured to drive autonomously or automatically, that is, can take full control of driving the vehicle, such as accelerating, braking, steering, and the like. The autonomous vehicle is referred to as the vehicle. In some examples, the vehicle can drive autonomously under a first type of driving environment, such as on roads with well-maintained surfaces and lane markings. In some examples, the vehicle does not drive autonomously under a second type of driving environment or an off-road driving environment. The off-road driving environment can lack navigating reference features, such as lane markings, road signs, and the like. The off-road environment can also include features that cause the vehicle not to implement autonomous driving, such as a stream of water, and the like. According to aspects of the disclosure, when the vehicle fails to drive autonomously under an off-road driving environment, an apparatus can be configured to collect data related to a driving condition, routing the vehicle, and driving the vehicle under the driving condition. A driving condition can include the off-road driving environment and motion of the vehicle. In addition, the apparatus can be configured to form a vehicle training dataset based on the data, and to train the vehicle based on the vehicle training dataset to drive autonomously under the off-road driving environment. The apparatus can also be configured to generate an augmented vehicle training dataset, i.e., variations of the vehicle training dataset, and train the vehicle using the augmented vehicle training dataset.

Figure 1:
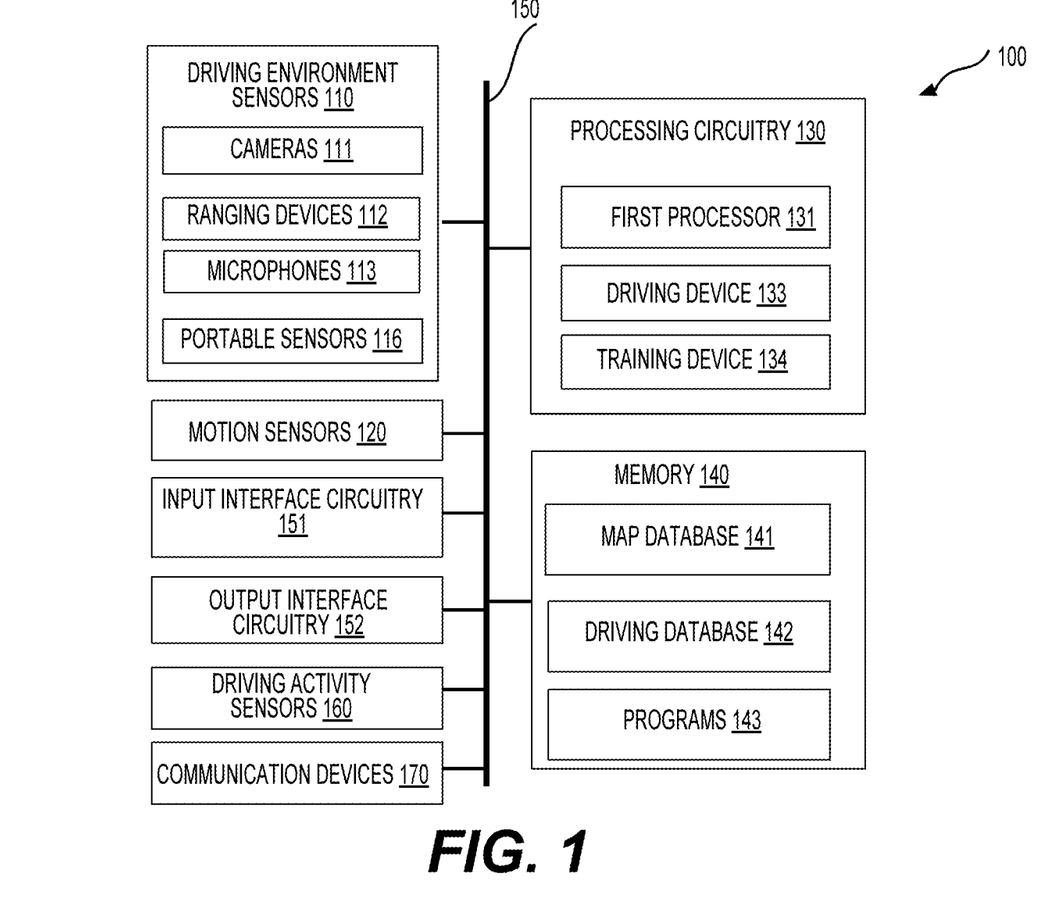
FIG. 1 is a schematic of an exemplary apparatus 100 according to an embodiment of the disclosure.

FIG. 1 is a schematic of an exemplary apparatus 100 according to an embodiment of the disclosure. The apparatus 100 can include driving environment sensors 110, motion sensors 120, input interface circuitry 151, output interface circuitry 152, driving activity sensors 160, communication devices 170, processing circuitry 130, and memory 140, coupled together using a bus 150. The apparatus 100 can be configured to cause the vehicle to drive autonomously under a first type of driving environment including s, such as on roads with well-maintained surfaces and lane markings. When the apparatus 100 fails to cause the vehicle to drive autonomously under a second type of driving environment or an off-road driving environment, the apparatus 100 can be configured to collect data and form a vehicle training dataset related a driving condition including the off-road driving environment and motion of the vehicle, and to train the vehicle based on the vehicle training dataset to drive autonomously under the off-road driving environment. In an embodiment, the off-road driving environment lacks navigating reference features, such as lane markings, road signs, and the like. The off-road environment can also include features that cause the vehicle not to implement autonomous driving, such as a stream of water, and the like. Further, the apparatus 100 can be configured to generate an augmented vehicle training dataset and further train the vehicle using the augmented vehicle training dataset.

In general, a driving condition can include a driving environment of the vehicle, motion of the vehicle, and the like. The driving environment of the vehicle, or the driving environment, can include surface conditions of roads, lane markers, road signs, objects including other vehicles and pedestrians on the roads, and the like. The driving environment can be a first type of driving environment, an off-road driving environment, and the like. The motion of the vehicle can include acceleration, velocity, position, and the like of the vehicle.

The driving environment sensors 110 can include any suitable devices that detect a driving environment of the vehicle. In an embodiment, the driving environment sensors 110 can include cameras 111, ranging devices 112, microphones 113, portable sensors 116, and the like. The cameras 111 can record videos and generate images of a driving environment surrounding the vehicle. The ranging devices 112 can be configured to measure depth information, i.e., distance between a target and a reference point, such as a point associated with a ranging device. The ranging devices 112 can include multiple devices that provide complementary depth information, such as stereo cameras, radars, light detection and ranging devices (LIDARs), ultrasonic sensors, and the like. In an example, an image can be generated by a ranging device to show depth information, i.e., distances from a reference point to points (or targets) in the image.

The microphones 113 can detect various sound signals, such as sounds from a fire engine, an ambulance, a police car, winds, rain, and the like. In an example, motion of a sound source including a velocity and a position of the sound source can also be obtained, for example, using multiple microphones.

In an embodiment, the cameras 111, the ranging devices 112, and the microphones 113 can be configured to collect complementary data. For example, the cameras 111 and the ranging devices 112 can be used to collect images and depth information of a driving environment, respectively. In another example, images from the cameras 111 and sound information from the microphones 113 can be used to determine certain driving environment, for example, a fire engine coming from behind the vehicle.

The portable sensors 116 can include any suitable portable sensing devices, for example cameras, ranging devices, microphones, and the like, to collect data of a driving environment of the vehicle. The portable sensors 116 can be detachable from the vehicle. In an example, the portable sensors 116 are detached from the vehicle, such as deployed outside of the vehicle to collect data of a driving environment surrounding the vehicle. In another example, the portable sensors 116 are attached to the vehicle. The portable sensors 116 can communicate with the vehicle using wired communication, for example, when the portable sensors 116 are attached to the vehicle. The portable sensors 116 can also communicate with the vehicle using wireless communication, for example, when the portable sensors 116 are detached from the vehicle.

The motion sensors 120 can include any suitable devices configured to obtain motion of the vehicle, such as acceleration, velocity, and position of the vehicle. In an example, the motion sensors 120 can include a receiver and an inertia measurement unit (IMU). In an example, the receiver can receive positioning information from various satellite-based positioning systems such as a global positioning system (GPS), and determine a position of the vehicle. In some examples, the position can be a physical address, the latitude and longitude coordinates of a geographic coordinate system used by satellite-based positioning systems such as a GPS, and the like. The IMU is a platform having multiple gyroscopes and accelerometers fixed to the vehicle, and can provide information on rotational and linear motions of the platform. The information is then used to obtain motion of the vehicle. Note that the IMU can provide a position of the vehicle when a reference position of the vehicle, such as a position when the IMU starts to operate, is given. In an example, the reference position of the vehicle can be obtained from the receiver or entered manually.

The input interface circuitry 151 can be configured to receive data related to a driving environment, such as features of the driving environment. For example, the features can include edge lines that outline an outside edge of a road, lane markers, pedestrians and other vehicles on roads, and the like. In addition, the input interface circuitry 151 can also be configured to receive data related to routing the vehicle under a driving environment. The input interface circuitry 151 can include any suitable individual device or any suitable integration of multiple devices such as touch screens, keyboards, keypads, a mouse, joysticks, microphones, universal series bus (USB) interfaces, optical disk drives, wireless receivers, and the like. The input interface circuitry 151 can also include a controller that convert data into electrical signals and send the electrical signals to the processing circuitry 130.

The output interface circuitry 152 can be configured to output data related to a driving environment and a respective driving mode of the vehicle, information related to the driving environment and the respective driving mode, and the like. In an example, a driving environment can be a first type of driving environment and an off-road driving environment. In an example, a driving mode can include autonomous driving associated with a first type of driving environment when autonomous driving is implemented, non-autonomous driving associated with an off-road driving environment when autonomous driving is not implemented, and the like. Further, the data can include information related to a driving mode. For example, the information related to the non-autonomous driving can be 'The vehicle cannot find lane markers', 'The vehicle does not understand the road surface', and the like.

The output interface circuitry 152 can include any suitable individual device or any suitable integration of multiple devices such as display devices, audio devices, such as speakers, wireless transmitters, and the like. The output interface circuitry 152 can also include a controller that convert electrical signals from the processing circuitry 130 to the data, such as visual signals including text messages used by a display device, audio signals used by a speaker, and the like. In an example, a component of the input interface circuitry 151 and a component of the output interface circuitry 152 can be combined into a device. For example, the output interface circuitry 152 can be configured to output an image on an interactive screen and the input interface circuitry 151 can be configured to receive data generated by a stylus interacting with the interactive screen.

In an example, the output interface circuitry 152 can output inquires, such as questions, comments, and the like related to a driving mode and a driving environment. For example, the inquires can include features of a driving environment, such as width of a road, a slope of a road such as grade of a road, positions of trees or other objects blocking a road, characteristics of a road surface, and the like. The input interface circuitry 151 can be configured to receive data related to the inquiries, for example, features of a driving environment, such as width of a road, a slope of a road such as grade of a road, positions of trees or other objects blocking a road, characteristics of a road surface such as deep water or shallow water, and the like.

The driving activity sensors 160 can include any suitable sensors that detect data related to driving activities of the vehicle, such as accelerating, braking, steering, and the like.

The communication devices 170 can be configured to communicate with any suitable device using any suitable communication technologies, such as wired, wireless, fiber optic communication technologies, and any suitable combination thereof. In an example, the communication devices 170 can be used to communicate with other vehicles in vehicle to vehicle (V2V) communication, and with an infrastructure, such as a cloud services platform, in vehicle to infrastructure (V2X) communication. In an example, the communication devices 170 can communicate with the portable sensors 116 and other mobile devices including a mobile phone via any suitable wireless technologies such as IEEE 802.15.1 or Bluetooth. In an example, a mobile device such as a mobile phone can collect data related to a driving environment, routing the vehicle, and the like. In an embodiment, the communication devices 170 can include any suitable communication devices using any suitable communication technologies. In an example, the communication devices 170 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

Note that the driving environment sensors 110, the motion sensors 120, the input interface circuitry 151, the driving activity sensors 160, and the like, can be configured to collect complementary data. In addition, the driving environment sensors 110, the motion sensors 120, the input interface circuitry 151, the driving activity sensors 160, and the like, can be configured to collect redundant data, thus, if certain devices malfunction, data can be collected by other devices.

The processing circuitry 130 can include a first processor 131, a driving device 133, a training device 134, and the like. The first processor 131 can be configured to receive and process data from the driving environment sensors 110, the motion sensors 120, the input interface circuitry 151, the driving activity sensors 160, and the like. In an embodiment, the processed data related to the driving condition can be sent to the driving device 133 that is configured to implement autonomous driving. For example, the first processor 131 can resample and compress data. In another example, the first processor 131 can also extract features, for example, from images and videos. The first processor 131 can also convert data from the motion sensors 120 and the input interface circuitry 151 to routing commands corresponding to a driving environment. In addition, the first processor 131 can convert data from the driving activity sensors 160 to driving commands that can include a suitable combination of accelerating, braking, and steering.

The first processor 131 can also be configured to form a vehicle training dataset from processed data associated with a driving condition. In an example, the vehicle training dataset can include signal pairs having an input signal and a corresponding expected output signal. For example, the input signal can be processed data, such as multiple 2D arrays storing an image of a driving environment, and the expected output signal can be based on routing commands and/or driving commands, such as a vector including driving commands related to the driving environment. The vehicle training dataset can be sent to the training device 134 that is configured to train the vehicle to implement autonomous driving under the driving condition.

The driving device 133 can be configured to implement autonomous driving based on processed data related to a driving condition. In an example, the driving device 133 can include using an artificial neural network, also referred to as a neural network. In general, a neural network can learn and perform a data-driven task from examples, referred to as learning examples, without task specific instructions. A neural network can be based on a computational model including nodes. The nodes, interconnected by connections, can perform computational tasks. In an embodiment, a neural network can be characterized by a computational model and parameters. In an example, the parameters can include weights and thresholds associated with connections and nodes in the neural network.

In an embodiment, a neural network can be organized in multiple layers where different layers can perform different kinds of computations. The multiple layers can include an input layer having input nodes, an output layer having output nodes, and hidden layers having nodes between the input layer and the output layer. In an embodiment, the input layer can receive a signal originated from outside of the neural network. The output layer can send a result to outside of the neural network. Further, a neural network can be a deep neural network that has a relatively larger number of hidden layers than that of a shallow neural network. In an example, a neural network can be a convolutional neural network (CNN).

A computational model of a neural network can be determined by hand, search algorithms, and the like. Subsequently, the neural network can be trained using learning examples related to a certain task, such as autonomous driving. As a result, the parameters are modified repetitively when additional learning examples are used. In an embodiment, a large number of learning examples can be organized into multiple independent datasets, such as a training dataset and a validation dataset, to train and validate a neural network, thus obtain an optimal neural network.

In an embodiment, neural networks having various computational models can be trained using multiple training methods based on a training dataset having learning examples. In an embodiment, a learning example can include a signal pair having an input signal and an expected output signal, as described above. An input layer of a neural network can receive the input signal, and the neural network can subsequently generate a result via the output layer. The result can be compared with the expected output signal. In an example, the parameters of the neural network are modified or optimized to minimize a difference between the result and the expected output signal.

Therefore, the parameters of the neural network are optimized by the training dataset. Subsequently, the neural networks having various computational models can be trained to have optimized parameters. An optimal neural network can be obtained by applying the validation dataset on the neural networks, analyzing the results and the expected output signals associated with the validation dataset. The optimal neural network can then be deployed to perform a certain task, such as autonomous driving. Alternatively, performance of the optimal neural network can be further assessed by a test dataset before the optimal neural network is deployed to perform a task. In an example, the test dataset is independent from other datasets, such as the training dataset and validation dataset.

In an embodiment, the driving device 133 can be configured to implement autonomous driving using a first neural network optimized by a training dataset and a validation dataset. Further, the first neural network can be tested using a test dataset. The driving device 133 can receive a signal, such as processed data from the first processor 131 related to a driving condition. For example, the signal can include multiple 2D arrays storing an image of a driving environment. The signal can also include depth information corresponding to the image of the driving environment. In addition, the signal can include sound information from the microphones 113 and motion of the vehicle from the motion sensors 120. The driving device 133 can generate a result corresponding to the signal by using the first neural network. In an example, the result can include a vector describing driving commands. Alternatively, the result can also include a vector describing routing commands, and driving commands can be generated based on the routing commands and motion of the vehicle, for example, by the driving device 133. Further, the driving device 133 can cause actuators to accelerate, brake, steer the vehicle according to the driving commands. In an example, the first neural network used by the driving device 133 can be a deep neural network, such as a CNN. In an example, the first neural network can also include multiple interconnected neural networks.

In some examples, when a first neural network receives a signal related to a driving environment, such as an off-set driving environment, that substantially differs from learning examples in a training dataset and a validation dataset, the first neural network can fail to implement autonomous driving. Meanwhile, the training device 134 can be configured to modify the first neural network and to generate a second neural network that can implement autonomous driving under the driving environment. As described above, the first neural network can be characterized by a computational model and first parameters, and the second neural network can be characterized by the computational model and second parameters. In an embodiment, the first parameters can be modified to be the second parameters when the first neural network is trained by the vehicle training dataset formed by the first processor 131 as described above. Note that a validation dataset can be omitted when the computational model does not change.

Further, the training device 134 can be configured to generate an augmented vehicle training dataset, i.e., variations of the vehicle training dataset, and train the second neural network using the augmented vehicle training dataset.

The memory 140 is configured to store a map database 141 including road maps, a driving database 142 including the vehicle training dataset and the augmented vehicle training dataset, and programs 143. In an embodiment, the programs 143 can include the first neural network having the first parameters and the second neural network having the second parameters. In an example, the second parameters are optimized based on the first parameters and the vehicle training dataset. In one embodiment, information in the memory 140 can be modified by the processing circuitry 130. For example, the road maps can be modified by the first processor 131, and the second parameters can be progressively modified by the training device 134. The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the communication device 170.

In the FIG. 1 example, the components are coupled together by a bus architecture including a bus 150. Other suitable interconnection techniques can also be used.

One or more components of the input interface circuitry 151, the output interface circuitry 152, the processing circuitry 130, and the memory 140 can be made by discrete devices or integrated devices. The circuits for one or more of the input interface circuitry 151, the output interface circuitry 152, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

During operation, the driving environment sensors 110 and the motion sensors 120 can collect initial data related to a driving condition including a driving environment and motion of the vehicle. The first processor 131 can process the initial data. Further, the processed initial data related to the driving condition can be sent to the driving device 133. In an example, the driving device 133 can implement autonomous driving based on the processed initial data. For example, autonomous driving is implemented using a first neural network, and the first neural network can generate a result, or a series of driving commands, that causes actuators to accelerate, brake, and steer the vehicle accordingly.

In another example, the driving device 133 can fail to implement autonomous driving under the driving condition including an off-road driving environment, and the output interface circuitry 152 can output data indicating a non-autonomous driving mode associated with the off-road driving environment. Further, the data can include information related to a driving mode. For example, the information related to the non-autonomous driving can be 'The vehicle cannot find lane markers', 'The vehicle does not understand the road surface', and the like. The output interface circuitry 152 can also output inquires, such as questions, comments, and the like related to the driving mode and the off-road driving environment.

The driving environment sensors 110, the motion sensors 120, the input interface circuitry 151, and the driving activity sensors 160 can be configured to collect additional data related to the driving condition including the off-road driving environment and routing/driving the vehicle under the driving condition. The first processor 131 can be configured to process the additional data and form a vehicle training dataset. Subsequently, the training device 134 can be configured to modify the first neural network and to generate a second neural network that can implement autonomous driving under the driving condition. The training device 134 can also be configured to generate an augmented vehicle training dataset, and further modify the second neural network using the augmented vehicle training dataset.

Accordingly, the driving database 142 and the programs 143 can also be updated and uploaded to a cloud services platform that can provide on-demand delivery of computing power, database storage, and IT resources or shared with other vehicles using the communication devices 170 via V2X and V2V communications, respectively.

Figure 2:
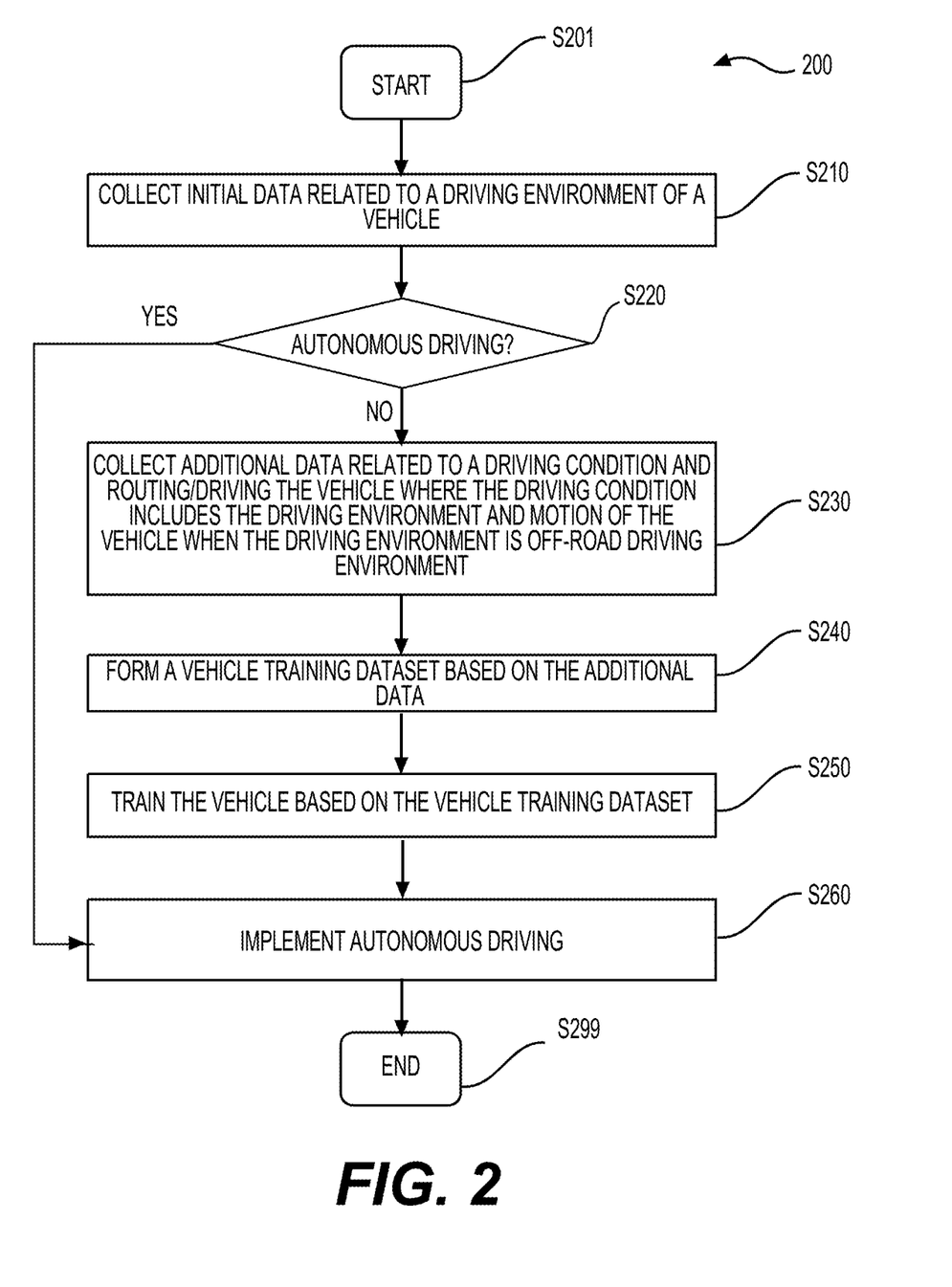
FIG. 2 is a flowchart outlining an exemplary process 200 according to an embodiment of the disclosure.

FIG. 2 is a flowchart outlining an exemplary process 200 according to an embodiment of the disclosure. In an example, the process 200 can be implemented using the apparatus 100 shown in FIG. 1. In an embodiment, the process 200 can be used to form a vehicle training dataset, and train a vehicle to implement autonomous driving when the vehicle fails to implement autonomous driving under an off-road driving environment. The process 200 starts at S201 and proceeds to S210.

At S210, data related to a driving environment is collected. In an example, the data can be collected using the driving environment sensors 110. The driving environment can include surface condition of roads, lane markers, road signs, objects including other vehicles and pedestrians on the roads, and the like. The data related to the driving environment can include videos and images of surroundings of the vehicle from the cameras 111, depth information from the ranging devices 113, sound information from the microphones 113, and the like.

At S220, a decision to implement autonomous driving can be made based on the data related to the driving environment. In an example, the data related to the driving environment can be processed by the first processor 131. The data can be sent to the driving device 133 that is configured to make the decision using, for example, a first neural network having first parameters stored in the programs 143.

As described above, the first neural network can be trained to implement autonomous driving using a training dataset and a validation dataset. In an example, an off-road driving environment, may not be included in the training and validation dataset, thus, the first neural network can fail to implement autonomous driving under the off-road driving environment. For example, the training and validation dataset do not include learning examples related to roads without lane markings, a shallow stream, and the like. Accordingly, the driving device 133 can determine not to implement autonomous driving based on the processed data related to the off-road driving environment described above. The process 200 then proceeds to S230.

On the other hand, the driving device 133 can also determine to implement autonomous driving based on the processed data related to the driving environment, for example, when the driving environment is a first type driving environment similar to one or more learning examples in the training and validation dataset. The process 200 then proceeds to S260.

At S230, additional data related to the driving condition including the off-road driving environment and routing/driving the vehicle can be obtained. In an example, the driving environment sensors 110, the motion sensors 120, the input interface circuitry 151, and the driving activity sensors 160 can be used to collect the additional data. The additional data can be processed by the first processor 131 to form a vehicle training dataset.

In an embodiment, the off-road driving environment lacks navigating reference features, such as lane markings, road signs, and the like. In an example, the off-road environment can include features that cause the vehicle not to implement autonomous driving, such as a stream of water, and the like. The vehicle can be driven through the off-road driving environment while the driving environment sensors 110 can be configured to collect a first data of the additional data related to the off-road driving environment. The driving activity sensors 160 can be used to collect a second data of the additional data related to driving the vehicle, such as driving activities. In an example, the vehicle can be driven through the off-road driving environment by remotely controlling the vehicle from an infrastructure communicating with the vehicle via the communication devices 170. In another example, a person inside the vehicle can drive the vehicle through the off-road driving environment. In addition, the vehicle can be driven through a first segment of the off-road driving environment by remotely controlling the vehicle from the infrastructure, and a person inside the vehicle can drive the vehicle through a second segment of the off-road driving environment. In an example, the first and second data of the additional data can be synchronized by synchronizing the driving environment sensors 110 and the driving activity sensors 160, for example, using timestamp-based synchronization.

In another example, a first data of the additional data related to the off-road driving environment can be collected by the driving environment sensors 110, for example. Further, the output interface circuitry 152 can output data, such as an image, related to the off-road driving environment on, for example, an interactive screen. In an example, a device, such as a stylus controlled by the driver, can paint a route on the interactive screen for the vehicle to drive through the off-road driving environment. The input interface circuitry 151 can be configured to convert the route painted, for example, on the interactive screen into routing commands, i.e., a second data of the additional data related to routing the vehicle.

In another example, the portable sensors 116 can be deployed outside of the vehicle to outline a route through the off-road driving environment and to collect a first data of the additional data, such as videos and images, related to the off-road driving environment. In an example, the portable sensors 116 can be attached to a person walking through the off-road driving environment. Further, positions of the portable sensors 116 can be obtained using the driving environment sensors 110, and routing commands can be constructed from the positions as a second data of the additional data related to routing the vehicle. In an example, the first and second data of the additional data can be synchronized by synchronizing the driving environment sensors 110 and the portable sensors 116, for example, using timestamp-based synchronization.

In an example, a first data of the additional data related to the off-road driving environment can also be collected by the input interface circuitry 151. As described above, the output interface circuitry 152 can output inquires related to the off-road driving environment, such as width of a road, a slope of a road such as grade of a road, positions of trees or other objects blocking a road, characteristics of a road surface, and the like. The input interface circuitry 151 can be configured to receive features related to the off-road driving environment, such as width of a road, a slope of a road such as grade of a road, positions of trees or other objects blocking a road, characteristics of a road surface such as deep water or shallow water, and the like.

In addition, additional data related to an off-road driving environment, routing the vehicle, and the like, can also be sent to the apparatus 100 via the communication devices 170. In an example, the additional data can be collected by a mobile device, such as a mobile phone.

At S240, a vehicle training dataset can be formed based on the additional data related to the off-road driving environment, routing, and driving the vehicle. In an example, the additional data are received and processed by the first processor 131. As described above, the first processor 131 can resample and compress the first data of the additional data, extract features, and the like. The first processor 131 can also obtain routing commands or driving commands from the second data of the additional data.

The first processor 131 can be configured to form the vehicle training dataset from the processed additional data. As described above, the vehicle training dataset can include signal pairs having an input signal and an expected output signal. For example, the input signal can include multiple 2D arrays storing an image of the off-road driving environment, and the expected output signal can include routing or driving commands. In an example, the input signal can also include features extracted from the additional data. For example, edge lines that outline an outside edge of a road can be extracted and labeled on an image, the image with labeled edge lines can be the input signal.

At S250, the vehicle can be trained based on the vehicle training dataset related to the off-road driving environment. In an example, the training device 134 can be configured to receive the vehicle training dataset, and train the vehicle to implement autonomous driving under the off-road driving environment. For example, the training device 134 can modify the first neural network used by the driving device 133 and generate a second neural network that can implement autonomous driving under the driving condition.

In an example, S230 to S250 can be implemented iteratively until the driving device 134 can implement autonomous driving corresponding to the off-road driving environment. In addition, the second neural network and the vehicle training dataset can be stored in memory, for example, by updating the driving database 142 and the programs 143, and shared with a cloud services platform and/or other vehicles, for example, using the communication devices 170 via V2X and V2V communications, respectively. The process 200 then proceeds to S260. At S260, autonomous driving is implemented. In an example, the driving device 133 can implement the autonomous driving, for example, using the first neural network or the second neural network that is updated by the training device 134. The process proceeds to S299 and terminates.

Alternatively, the current driving environment can be divided into a plurality of driving segments. S230 to S260 can be implemented for each of the plurality of driving segments, respectively. For example, the driving environment can include a straight dirt road without lane markers, a turn blocked by trees, and a stream of water having a surface that the driving device 133 does not recognize. The off-road driving environment can be divided into three driving segments: the straight dirt road, the turn, and the stream of water. S230 to S260 can be implemented for the three driving segments, respectively.

Alternatively, S240 can be omitted. At S250, the vehicle can be trained based on the additional data.

Figure 3:
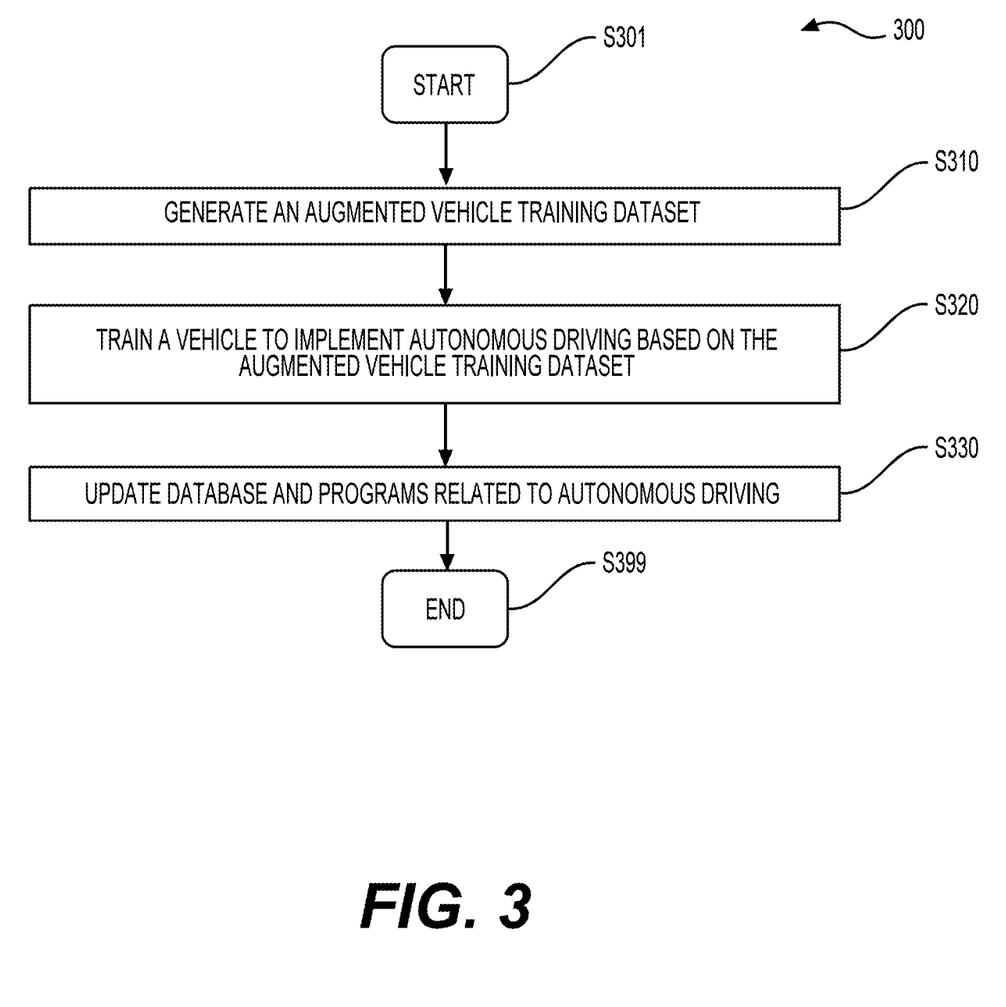
FIG. 3 is a flowchart outlining an exemplary process 300 according to an embodiment of the disclosure.

FIG. 3 is a flowchart outlining an exemplary process 300 according to an embodiment of the disclosure. In an example, the process 300 can be implemented using the apparatus 100 shown in FIG. 1. In an embodiment, the process 300 can be used to generate an augmented vehicle training dataset, and train a vehicle to implement autonomous driving based on the augmented vehicle training dataset. For example, the vehicle can implement autonomous driving under more off-road driving environments that are represented by learning examples in the augmented vehicle training dataset. The process 300 starts at S301 and proceeds to S310.

At S310, an augmented vehicle training dataset can be generated. In an example, the augmented vehicle training dataset can be generated by the training device 134. As described above, the vehicle training dataset corresponding to the off-road driving environment can be generated by the first processor 131 when the vehicle fails to drive under the off-road driving environment. Further, the augmented vehicle training dataset, i.e., variations of the vehicle training dataset can be obtained, for example, using computational simulations based on the vehicle training dataset.

At S320, the vehicle can be trained based on the augmented vehicle training dataset to implement autonomous driving. In an example, the training device 134 in FIG. 1 can be configured to train the vehicle to implement autonomous driving using the augmented vehicle training dataset. For example, the training device 134 can modify second parameters of a second neural network used by the driving device 133.

At S330, database and programs related to autonomous driving can be updated. For example, the second parameters related to the second neural network can be stored in the programs 143, and the augmented vehicle training dataset can be stored in the driving database 142. Therefore, the driving database 142 and the programs 143 in the memory 140 can be updated. Further, database and programs related to autonomous driving can also be updated via suitable communication technologies with a cloud services platform and/or other vehicles, for example, using the communication devices 170 via V2X and V2V communications, respectively. The process 300 then proceeds to S399, and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
   data collecting devices configured to collect initial data including first data related to a driving condition that includes a driving environment surrounding a vehicle and motion of the vehicle and second data related to driving the vehicle under the driving condition; and
   processing circuitry configured to
      determine, based on the initial data, the driving environment and a respective vehicle driving mode including a first type of driving environment and a respective autonomous driving mode and a second type of driving environment and a respective non-autonomous driving mode, the second type of driving environment being an off-road driving environment;
      implement autonomous driving when the vehicle driving mode is the autonomous driving mode;
      cause, in the non-autonomous mode, the data collecting devices to collect additional data including first data related to the driving condition and second data related to driving the vehicle under the driving condition when the vehicle is operated in the off-road driving environment; and
      train the vehicle to implement autonomous driving under the off-road driving environment based on the additional data.

2. The apparatus of claim 1, wherein the data collecting devices further comprise:
   a first set of the data collecting devices configured to collect the first data of the initial data and/or the additional data including images, videos, depth information, characteristics of the driving environment surrounding the vehicle, and the motion including acceleration, velocity, and position of the vehicle; and
   a second set of the data collecting devices configured to collect the second data of the initial data and/or the additional data related to driving the vehicle under the driving condition including routing or driving commands.

3. The apparatus of claim 1, wherein the processing circuitry further comprises a first artificial neural network, or a first neural network, that is based on a computational model implemented using interconnected nodes having connections and includes first parameters associated with the nodes and the connections.

4. The apparatus of claim 3, wherein the processing circuitry is configured to form a second neural network having second parameters when training the vehicle to implement autonomous driving in an off-road driving environment based on the additional data.

5. The apparatus of claim 4, wherein the processing circuitry is further configured to form a vehicle training dataset based on the additional data, generate an augmented vehicle training dataset based on variations of the vehicle training dataset, and modify the second neural network using the augmented vehicle training dataset.

6. The apparatus of claim 5, wherein the apparatus further comprises memory that is configured to store the initial data, the additional data, the vehicle training dataset, the augmented vehicle training dataset, the first neural network including the first parameters, and the second neural network including the second parameters.

7. The apparatus of claim 1, wherein the data collecting devices further comprise a portable sensor that is detachable from the vehicle and is configured to collect information related to the additional data.

8. The apparatus of claim 1, wherein the data collecting devices are configured to synchronize the first data and the second data of the additional data.

9. The apparatus of claim 1, where the data collecting devices further comprise interface circuitry configured to receive routing commands that are associated with the second data of the additional data.

10. The apparatus of claim 1, wherein the apparatus further comprises a wireless communication device configured to communicate wirelessly with another wireless communication device.

11. A method, comprising:
collecting initial data including a first data related to a driving condition that includes a driving environment surrounding a vehicle and motion of the vehicle and a second data related to driving the vehicle under the driving condition;
determining, based on the initial data, the driving environment and a respective vehicle driving mode including a first type of driving environment and a respective autonomous driving mode and a second type of driving environment and a respective non-autonomous driving mode, the second type of driving environment being an off-road driving environment;
implementing autonomous driving when the vehicle driving node is the autonomous driving mode;
collecting, in the autonomous mode, additional data including first data related to the driving condition and second data related to driving the vehicle under the driving condition when the vehicle is operated in the off-road driving environment; and
training the vehicle to implement autonomous driving under the off-road driving environment based on the additional data.

12. The method of claim 11, wherein collecting the initial data and/or the additional data further comprises:
collecting the first data of the initial data and/or the additional data including images, videos, depth information, characteristics of the driving environment surrounding the vehicle, and the motion including acceleration, velocity, and position of the vehicle; and
collecting the second data of the initial data and/or the additional data related to driving the vehicle under the driving condition including routing or driving commands.

13. The method of claim 11, wherein implementing autonomous driving when the vehicle driving mode is the autonomous driving mode comprises using a first artificial neural network, or a first neural network, that is based on a computational model having interconnected nodes with connections and includes first parameters associated with the nodes and the connections.

14. The method of claim 13, wherein training the vehicle to implement autonomous driving based on the additional data comprises fortning a second neural network having second parameters.

15. The method of claim 11, wherein collecting the additional data further comprises collecting driving activities of the vehicle including accelerating, braking, and steering.

16. The method of claim 11, wherein the driving environment is the off-road driving environment and collecting the additional data comprises:

collecting the first data of the additional data related to the off-road driving environment when the vehicle is driven through the off-road driving environment; and
collecting the second data associated with the first data when the vehicle is driven through the off-road driving environment, the second data including driving activities of the vehicle.

17. The method of claim 11, wherein collecting the additional data comprises collecting information related to the additional data using a portable sensor that is detachable from the vehicle.

18. The method of claim 11, wherein the driving environment is the off-road driving environment and collecting the additional data comprises:
collecting the first data of the additional data related to the off-road driving environment using a portable sensor deployed outside the vehicle;
collecting a series of positions of the portable sensor; and
generating the second data including routing the vehicle under the off-road driving environment based on the series of positions of the portable sensor.

19. The method of claim 11, wherein collecting the additional data further comprises synchronizing the first data and the second data of the additional data.

20. The method of claim 11, where collecting the additional data comprises receiving routing commands that are associated with the second data of the additional data via interface circuitry.

21. The method of claim 11, where the driving environment is the off-road driving environment and collecting the additional data comprises:
collecting the first data of the additional data related to the off-road driving environment;
outputting an image related to the off-road driving environment based on the first data using interface circuitry;
outlining a route for the vehicle to drive through the off-road driving environment using the interface circuitry; and
generating the second data including routing the vehicle under the off-road driving environment based on the route.

22. The method of claim 11, where the driving environment is the off-road driving environment and collecting the additional data comprises:
outputting inquires associated with the first data related to the off-road driving environment using interface circuitry; and
receiving features associated with the first data related to the off-road driving environment using the interface circuitry.

23. A non-transitory computer readable storage medium having instructions stored thereon that when executed by processing circuitry causes the processing circuitry to perform a method, the method comprising:
collecting initial data including a first data related to a driving condition that includes a driving environment surrounding a vehicle and motion of the vehicle and a second data related to driving the vehicle under the driving condition;
determining, based on the initial data, the driving environment and a respective vehicle driving mode including a first type of driving environment and a respective autonomous driving mode and a second type of driving environment and a respective non-autonomous driving mode, the second type of driving environment being an off-road driving environment;

implementing autonomous driving when the vehicle driving mode is the autonomous driving mode;

collecting, in the non-autonomous mode, additional data including first data related to the driving condition and second data related to driving the vehicle under the driving condition when the vehicle is operated in the off-road driving environment; and training the vehicle to implement autonomous driving under the off-road driving environment based on the additional data.

* * * * *